United States Patent
Chron et al.

(10) Patent No.: US 8,260,622 B2
(45) Date of Patent: Sep. 4, 2012

(54) COMPLIANT-BASED SERVICE LEVEL OBJECTIVES

(75) Inventors: Edward G. Chron, Sunnyvale, CA (US); David A. Pease, Redwood Estates, CA (US); Elizabeth S. Richards, Columbia, MD (US); Sandeep M. Uttamchandani, San Jose, CA (US)

(73) Assignees: International Business Machines Corporation, Armonk, NY (US); National Security Agency, Ft. George G. Meade, MD (US)

( * ) Notice: Subject to any disclaimer, the term of this patent is extended or adjusted under 35 U.S.C. 154(b) by 967 days.

(21) Appl. No.: 11/674,197

(22) Filed: Feb. 13, 2007

(65) Prior Publication Data

US 2008/0195404 A1   Aug. 14, 2008

(51) Int. Cl.
  *G06Q 10/00* (2012.01)
  *G06F 11/00* (2006.01)
(52) U.S. Cl. ............... 705/1.1; 714/47.1; 714/48
(58) Field of Classification Search ............ 705/1.1; 714/47.1, 48
  See application file for complete search history.

(56) References Cited

U.S. PATENT DOCUMENTS

| | | | |
|---|---|---|---|
| 4,805,089 A * | 2/1989 | Lane et al. ............... 700/83 |
| 6,006,016 A | 12/1999 | Faigon et al. |
| 6,115,393 A * | 9/2000 | Engel et al. ............ 370/469 |
| 6,701,459 B2 | 3/2004 | Ramanathan et al. |
| 6,801,940 B1 | 10/2004 | Moran et al. |
| 7,031,878 B2 | 4/2006 | Cuddihy et al. |
| 7,155,715 B1 * | 12/2006 | Cui et al. ............... 717/177 |
| 7,266,733 B2 * | 9/2007 | Bazinet et al. ............... 714/45 |
| 7,395,187 B2 * | 7/2008 | Duyanovich et al. ......... 702/183 |
| 2002/0123983 A1 * | 9/2002 | Riley et al. .................. 707/1 |
| 2003/0167180 A1 * | 9/2003 | Chung et al. ................ 705/1 |
| 2004/0123029 A1 | 6/2004 | Dalal et al. |
| 2004/0163079 A1 | 8/2004 | Noy et al. |
| 2004/0243699 A1 | 12/2004 | Koclanes et al. |
| 2005/0038818 A1 | 2/2005 | Hooks |
| 2005/0125710 A1 | 6/2005 | Sanghvi |
| 2005/0203792 A1 * | 9/2005 | Kuppe et al. ................ 705/10 |
| 2005/0216325 A1 * | 9/2005 | Ziad et al. .................. 705/8 |

(Continued)

FOREIGN PATENT DOCUMENTS

WO   WO 2004/088443 A1   10/2004

OTHER PUBLICATIONS

U.S. Appl. No. 11/348,010, filed Feb. 6, 2006, Duyanovich, et al., Pending Publication.

(Continued)

*Primary Examiner* — Candice D Carter
*Assistant Examiner* — Sangeeta Bahl
(74) *Attorney, Agent, or Firm* — Gibb & Riley, LLC

(57) ABSTRACT

The embodiments of the invention provide methods, computer program products, etc. for complaint-based service level objectives. More specifically, a method of deducing undefined service level objectives receives complaints regarding behavior of a system. The complaints could include a severity parameter, an entity parameter, a nature-of-complaint parameter, a timestamp parameter, and/or an identification parameter. Next, system details representing a current state of the system are recorded for each of the complaints. The method then automatically analyzes a history of the system details and the complaints to produce a historical compilation of the system details. The analyzing can include weighing each of the system details by a severity parameter value.

13 Claims, 2 Drawing Sheets

U.S. PATENT DOCUMENTS

| | | | |
|---|---|---|---|
| 2006/0036619 A1* | 2/2006 | Fuerst et al. | 707/100 |
| 2006/0112135 A1 | 5/2006 | Warshawsky | |
| 2006/0123278 A1 | 6/2006 | Dini et al. | |
| 2006/0129998 A1 | 6/2006 | Florissi et al. | |
| 2006/0150163 A1 | 7/2006 | Chandane | |
| 2007/0168915 A1* | 7/2007 | Fabbio et al. | 717/101 |

OTHER PUBLICATIONS

Chung, et al., "Using Information from Prior Runs to Improve Automated Tuning Systems," Proceedings of SC"04, Nov. 2004, pp. 1-12.

Anderson, E., "HPL-SSP-2001-4: Simple table-based modeling of storage devices," Jul. 14, 2001, pp. 1-4.

Deng, et al., "High-Performance Robust Speech Recognition Using Stereo Training Data," Proceedings of International Conference on Acoustics, Speech, and Signal Processing, May 2001, pp. 301-304.

Gullickson, et al., "Using Experience to Guide Web Server Selection," Multimedia Computing and Networking, Jan. 1999, pp. 1-12.

Narayanan, et al., "Using History to Improve Mobile Application Adaptation," Proceedings of the $3_{rd}$ IEEE Workshop on Mobile Computing Systems and Applications, Dec. 2000, pp. 1-10.

Hartigan, John, "Clustering Algorithms," $99^{th}$ Edition, John Wiley & Sons, Inc., 1975, pp. 351.

Shah, et al., "Challenges in the Detection, Diagnosis and Visualization of Controller Performance Data," The IEEE Control & Automation Professional Network, Extended version of a paper that was presented at Control Systems—2004, pp. 7-21.

Pollack, et al., "Genesis: A Scalable Self-Evolving Performance Management Framework for Storage Systems," IEEE Computer Society, Proceedings of the $26^{th}$ IEEE International Conference on Distributed Computing Systems, 2006, 10 pages total.

Duyanovich et al., U.S. Appl. No. 11/674,198, Office Action Communication, Dec. 17, 2009, 15 pages.

Duyanovich et al., U.S. Appl. No. 11/674,198, Office Action Communication, Jun. 25, 2010, 22 pages.

* cited by examiner

COMPLIANT-BASED SERVICE LEVEL OBJECTIVES

This invention was made with Government support under Agreement No. H98230-05-3-0001 awarded by Intelligence Agencies. The Government has certain rights in the invention.

CROSS-REFERENCE TO RELATED APPLICATIONS

This application is related to co-pending U.S. patent application Ser. No. 11/674,198, filed Feb. 13, 2007, the complete disclosure of which is fully incorporated herein by reference.

BACKGROUND

1. Field of the Invention

The embodiments of the invention provide methods, computer program products, etc. for complaint-based service level objectives.

2. Description of the Related Art

A goal of the management software is to maximize the utility of the system—this is based on quality of service (QoS) input from the application writers or analysts, referred to as service level objectives (SLOs). An SLO defines the desired behavior thresholds the application expects from the underlying storage system, namely minimum throughput, maximum latency, minimal time-to-live (TTL) for the data-objects.

The task of defining SLOs for an application is complex and currently predominantly manual. It is difficult to translate application-level goals into resource-level constraints. In the real-world, the problem is solved by defining coarse-grained static classes of service (namely gold, silver, bronze, etc.) for each application, such that there are pre-defined thresholds for resources allocated within each class. The problem is further aggravated in large-scale storage systems which are always full. There is significantly more data than what the system can hold. Large-scale storage systems are also always utilized to the maximum, in contrast to traditional storage systems that have a low utilization at off-peak hours. Further, large-scale storage systems have data-driven access patterns. Hence, they are constantly changing and quite dynamic for humans to keep a track of.

In summary, it is generally difficult to predict application requirements upfront, translate them to resource-level constraints in an efficient fashion (instead of gross over-provisioning), and evolve these requirements for rapid variations in application access characteristics.

SUMMARY

The embodiments of the invention exploit the fact that the application administrators/analysts may not know the level of service they want, but will definitely complain about the service level they don't want. A framework is provided that deduces the application's SLO requirements based on the analyst/administrator's complaints. Details of the embodiments herein are for storage systems but they can be extended to systems in general.

Administrators are allowed to periodically register a finite number of complains. The complaints primarily consist of a severity level and the behavior attribute of the complaint, namely capacity, performance, and/or availability. For each complaint, a snaphsot of the current system state is taken using datamining techniques. The system state snapshots are analyzed to extract common value bounds for one or more measurable parameters that are possibly responsible for unsatisfactory behavior. These bounds serve as resource-level SLO thresholds that the management software can then enforce using constraint optimization. Additionally, in order to be reactive to frequent fluctuations, the hysteresis (i.e., the amount of historic complaint data used) are auto-adjusted for deriving the SLO thresholds. This is accomplished based on time-series analysis of the application characteristics.

Thus, methods and systems are provided for generating SLOs from complaints that are registered at run-time by human administrators/users. Application-level requirements are translated to resource-level constraints; and, the resource-level constraints are self-evolved for variations in access patterns. This includes identification of common value bounds for measurable parameters across system states.

The embodiments of the invention provide methods, computer program products, etc. for complaint-based service level objectives. More specifically, a method of deducing undefined service level objectives receives complaints regarding behavior of a system. The complaints could include a severity parameter, an entity parameter, a nature-of-complaint parameter, a timestamp parameter, and/or an identification parameter. Next, system details representing a current state of the system are recorded corresponding to each of the complaints. The method then automatically analyzes a history of the system details and the complaints to produce a historical compilation of the system details. The analyzing can include weighing each of the system details by a severity parameter value.

Following this, the method automatically identifies at least one set of values in the historical compilation of the system details. The identifying can also include determining whether at least one of the values is a random abnormality compared to a mean of the values. Subsequently, the method automatically deduces service level objectives for the system based on the set of values. This could include removing system details from the historical compilation of the system details. The removing of the system details can be triggered by one or more changes in workload access, cumulative load on a physical component, component response-time and throughput for a load characteristic, dependencies, and/or workflow.

Accordingly, the embodiments of the invention determine an application's SLO requirements for resources based on the analyst/administrator's complaints. For each complaint, a snapshot is taken of the current system state using data mining techniques. The system snapshots are analyzed to extract common value bounds for one or more measurable parameters that are possibly responsible for the unsatisfactory behavior.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS

Figure 1:
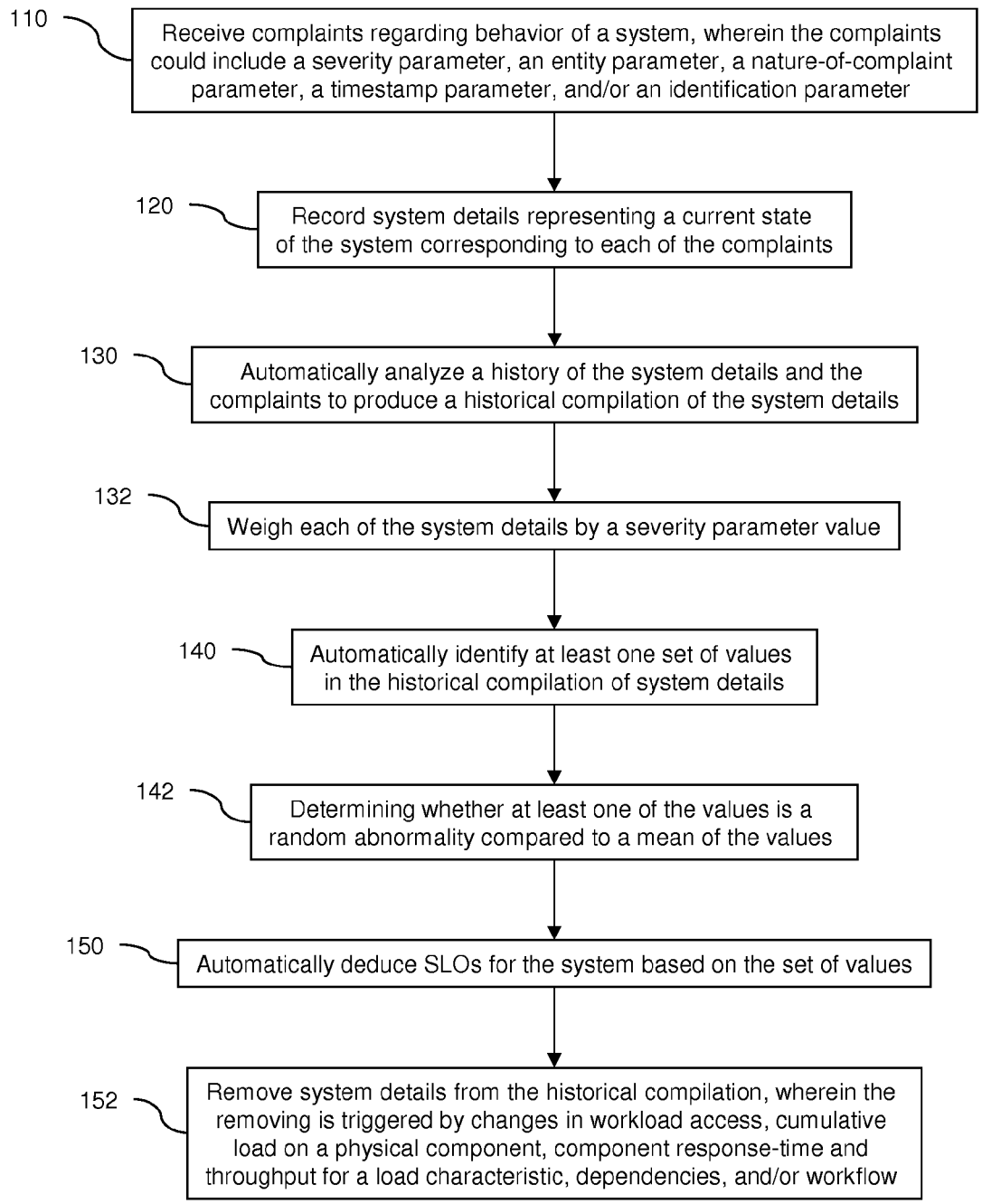
FIG. 1 is a flow diagram illustrating a method for deducing undefined service level objectives.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

Accordingly, the embodiments of the invention determine an application's SLO requirements for resources based on the analyst/administrator's complaints. For each complaint, a snapshot is taken of the current system state using data mining techniques. The system snapshots are analyzed to extract common value bounds for one or more measurable parameters that are possibly responsible for the unsatisfactory behavior.

A complaint is a quadruple of the parameters severity level, entity, nature of complaint, timestamp, and distillery clusterID (<S, E, N, T, ID>). More specifically, there can be n severity levels numbered 1 to n, where 1 is the lowest severity. Whether the complaint is for a job/stream, processing element (PE), or retention class determines the entity parameter. The nature of complaint is the behavior attribute for the complaint. Herein, the focus is on capacity and performance management. As such, the nature of the complaints can be: stream data objects (SDOs) not found (capacity management), degraded input/output (IO) rate (performance), high response time (performance), could not write SDO (capacity), etc. Furthermore, the timestamp parameter can clock the time when the complaint was registered; and, the distillery clusterID parameter can be for the distributed distillery framework.

Each analyst (running a job/stream) can be allowed to register a maximum of m complaint tokens every week, wherein m is the summation of the severity level for each complaint. The motivation for limiting the number of complaints is to allow fairness. Also, for analysts that do not register a complaint, the current state (current snapshot) is treated as the SLO.

A job/stream can be mapped to use the storage resources through several retention classes (RCs). Hence in response to a complaint for a specific job/stream, details of all the associated RCs can be recorded. For simplifying the details, it is assumed that an RC is mapped to a single storage location (Vat) only. The distillery records the following details of the system state: information collected per-RC (associated with the job) and information collected per-Vat. Information collected per-RC can include: object creation rate, object deletion rate, average age for deletion of objects, number of objects marked for long-term storage (i.e., a separate container), number of data misses, number of attribute misses, number of changes in RC value, number of reads/second, average response time, number of IO timeout errors, percentage of objects in the Vat belonging to this RC (optional parameter), and percentage of Vat bandwidth used by the RC (optional parameter). Information collected per-Vat can include: waterline, overall creation rate, average overall operations per second (IOPS) and megabits per second (MBps), average overall response time, histogram of IOPS (such that each data point represents an average over a 5-10 minute interval), variance in deletion age of the RCs, variance in access rates for each RC, and ratio of capacity to bandwidth utilization for each RC. These parameters can be collected by instrumenting the invocation path, namely the distillery object store and the general parallel file system (GPFS).

A goal of extracting SLOs by analyzing the history of complaint system states is to extract common bounds in the value of the measurable parameters. This is similar to Basket-data analysis (a technique commonly used in data mining) for correlating the items that are bought by the customers and to find patterns in the information (e.g., diapers and beer are bought together). The problem of analysis has the following characteristics: the analysis is not just a Boolean classification of attributes, but rather a numeric one; and, there is white-box knowledge available to reduce the correlation space, i.e., the combination of parameters that are analyzed for correlation are pre-defined.

The analysis process first identifies whether the complaint states were one-time random spikes or whether there is a pattern. In the case of a pattern, the process determines if there is a growth trend either in the RC access/creation rate or the overall load of the Vat. In the case of a pattern, correlation in the values of the parameters described below are determined.

For identifying whether the complaint state is a rare random spike, the difference in the values of RC are calculated, as well as Vat attributes with their mean across the historic states. In particular, it is desirable to identify whether the creation rate and access rates for the RC were unusually high that possibly led to the complaint; similarly whether the creation/access load of the Vat had a temporary surge. In addition to evaluating variance, frequency-based mining is deployed for the number of times the historic set of system states were within x% of the state under consideration. This evaluation is preferred since variance by itself can be misleading and ineffective in identifying repeating surges. The thresholds for variance, frequency, and x are deduced empirically based on bootstrapping experiments. The complaint states identified as a random spike are treated as outliers and filtered from the evaluation for SLO thresholds.

In determining if there is a growth trend, growth trends are indicative of the need to upgrade existing SLOs associated with the job/stream. The value for percentage growth is used as an initial adjustment to the existing SLO threshold values. The trend is detected by using existing time-series methods that forecast the future load, based on the historic data. The general form of time-series function is as follows:

$$y_{t+h} = g(X_t, \theta) = \epsilon_{t+h} \quad (1)$$

where: $y_t$ is the variable(s) vector to be forecast; t is the time when the forecast is made; $X_t$ are predictor variables, which usually include the observed and lagged values of $y_t$ till time t; $\theta$ is the vector of parameter of the function g; and, $\epsilon_{t+h}$ is the prediction error.

In addition to refining the SLO, the output values serve as a trigger to the corrective action engine (in particular the micro optimizer, assuming the action decision-making is divided into nano, micro, marco optimization).

Determining correlations in attribute values using pre-defined policies is used to determine bounds in the value of one or more state parameters in the history of complaint states. The search for value bounds is directed by the following pre-defined policies: the average age range for deletion of objects, the average range for response-time and IOPS, the average Vat waterline, the range for the number of misses for data and attributes, correlation between creation rate of the RC and the overall variance in the Vat, correlation between the range for the number of access and the overall load on the Vat, correlation between the number of times the RC is modified and the number of objects marked for long-term storage, and correlation between waterline and the variance in access rates for each of the Vats. The correlation analysis is weighted by the severity level associated with each state.

Output of the analysis is used to develop association rules (that are enforced as SLOs by the corrective action engine). An example of these association rules is as follows: response time for RC is less than 15 msec; range for IOPS is 1250-2000; average deletion age is less than 70 days; and, creation rate is greater than 2000 objects/second and Vat value variance is greater than 2.2, trigger correction. In this example, the corrective action engine will ensure that the response time is less than 15 msec, wherein the number of IOPS provisioned for this RC is 1250-2000 IOPS.

As the system evolves, embodiments herein automatically filter complaint information related with a different configuration of the system. In particular, one or more of the following changes are used as triggers for purging the history of complaint states: change in the workload access, change in the cumulative load on physical component, change in the component response time and throughput for a given load characteristics, change in the dependencies, and change in the workflow. The triggers are formalized as a system abnormality, as described below. The triggers signify that the system has changed and that the history of complaints is deleted.

Embodiments herein track these changes by treating them as abnormalities. The raw monitor data is extracted and the normality models for load and performance are evolved using a clustering approach. Under normal conditions, the performance of a component should be similar under similar loads. The load is considered to be an input and the performance to be an output of the component being monitored. In order to determine if a monitored component is performing normally, it is preferable to use the load (input) to find what the normal performance (output) should be based on history and compare it to the current performance. This can be represented as $N(L)=P$, where N is the model of normality for performance, L is the load measurement, and P is the normal performance for the load L. Further, L=<rw, rs, sz, iops> where rw is the read/write ratio, rs is the random/sequential ratio, sz is the average request size, and iops is the 10 s per second. Additionally, P=<lat> where lat is the average latency of requests.

Embodiments herein also maintain a history of the dependencies of each workload, as well as changes to the workflow. Any changes to the workflow are considered abnormalities. The dependencies are represented as a historical mean. Dependencies are defined as the interaction between different components in the 10 path. A dependency is defined as the component name and the percentage of the overall requests served by the component. Variance can be calculated by using either a moving average over some window of time, or to be more space efficient, by using a decay factor to give less weight to older data. The decay factor $0<\alpha<1$ is used herein; and, the mean and variance for $x_n$ are calculated.

An abnormality event is generated whenever the dependency values change by a certain number of standard deviations (based on the accepted false-positive rate) from the historical mean. By using a moving average, embodiments herein can automatically adapt to changes in the system over time. For instance, if a workload changes its working set of files to a new storage pool, the dependencies in the system between these components will change. At first, this can be correctly considered abnormal since the load has shifted. If the abnormality detected is not considered a problem that needs to be changed (and therefore isn't changed) embodiments herein can evolve to consider the new dependencies to be normal.

The embodiments of the invention provide methods, computer program products, etc. for complaint-based service level objectives. More specifically, a method of deducing undefined service level objectives receives complaints regarding behavior of a system. The complaints could include a severity parameter, an entity parameter, a nature-of-complaint parameter, a timestamp parameter, and/or an identification parameter. As described above, each analyst (running a job/stream) can be allowed to register a maximum of m complaint tokens every week, wherein m is the summation of the severity level for each complaint. The motivation for limiting the number of complaints is to allow fairness.

Next, system details representing a current state of the system (also referred to herein as "snapshots") are recorded corresponding to each of the complaints. The method then automatically analyzes a history of the system details and the complaints to produce a historical compilation of the system details. As described above, the system state snapshots are analyzed to extract common value bounds for one or more measurable parameters that are possibly responsible for unsatisfactory behavior. The analyzing can include weighing each of the system details by a severity parameter value. As described above, there can be n severity levels numbered 1 to n, where 1 is the lowest severity.

Following this, the method automatically identifies at least one set of values in the historical compilation of the system details. As described above, this is similar to Basket-data analysis (a technique commonly used in data mining) for correlating the items that are bought by the customers and to find patterns in the information (e.g., diapers and beer are bought together). The identifying can also include determining whether at least one of the values is a random abnormality compared to a mean of the values. As described above, the difference in the values of RC are calculated, as well as Vat attributes with their mean across the historic states. In particular, it is desirable to identify whether the creation rate and access rates for the RC were unusually high that possibly led to the complaint; similarly whether the creation/access load of the Vat had a temporary surge.

Subsequently, the method automatically deduces service level objectives for the system based on the set of values. This could include removing system details from the historical compilation of the system details. The removing of the system details can be triggered by one or more changes in workload access, cumulative load on a physical component, component response-time and throughput for a load characteristic, dependencies, and/or workflow. As described above, these changes can be treated as abnormalities. The raw monitor data is extracted and the normality models for load and performance are evolved using a clustering approach. Under normal conditions, the performance of a component should be similar under similar loads. The load is considered to be an input and the performance to be an output of the component being monitored. In order to determine if a monitored component is performing normally, the load (input) can be used to determine what the normal performance (output) should be based on history, which is compared to the current performance.

FIG. 1 is a flow diagram illustrating a method for deducing undefined service level objectives. The method begins in item 110 by receiving complaints regarding behavior of a system. The complaints could include a severity parameter, an entity parameter, a nature-of-complaint parameter, a timestamp parameter, and/or an identification parameter. As described above, each analyst (running a job/stream) can be allowed to register a maximum of m complaint tokens every week, wherein m is the summation of the severity level for each complaint.

Next, in item 120, system details representing a current state of the system (also referred to herein as "snapshots") are recorded corresponding to each of the complaints. In item 130, the method then automatically analyzes a history of the system details and the complaints to produce a historical compilation of the system details. The analyzing can include, in item 132, weighing each of the system details by a severity parameter value. As described above, there can be n severity levels numbered 1 to n, where 1 is the lowest severity.

Following this, in item 140, the method automatically identifies at least one set of values in the historical compilation of the system details. As described above, this is similar to Basket-data analysis for correlating the items that are bought by the customers and to find patterns in the information. The identifying can also include, in item 142, determining whether at least one of the values is a random abnormality compared to a mean of the values. As described above, it is desirable to identify whether the creation rate and access rates for the RC were unusually high that possibly led to the complaint.

Subsequently, in item 150, the method automatically deduces service level objectives for the system based on the set of values. This could include, in item 152, removing system details from the historical compilation of the system details. The removing of the system details can be triggered by one or more changes in workload access, cumulative load on a physical component, component response-time and throughput for a load characteristic, dependencies, and/or workflow. As described above, these changes can be treated as abnormalities. The raw monitor data is extracted and the normality models for load and performance are evolved using a clustering approach.

The embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 2:
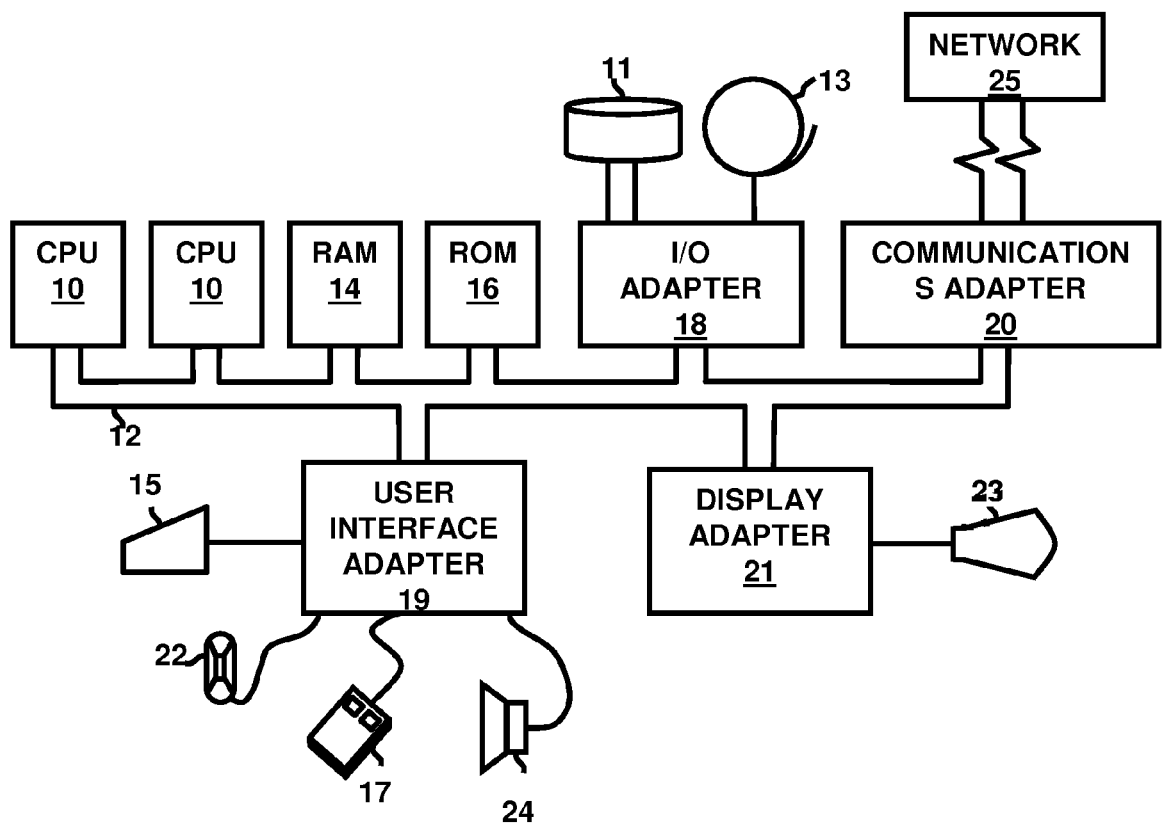
FIG. 2 is a diagram illustrating a computer program product for deducing undefined service level objectives.

A representative hardware environment for practicing the embodiments of the invention is depicted in FIG. 2. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Accordingly, the embodiments of the invention determine an application's SLO requirements for resources based on the analyst/administrator's complaints. For each complaint, a snapshot is taken of the current system state using data mining techniques. The system snapshots are analyzed to extract common value bounds for one or more measurable parameters that are possibly responsible for the unsatisfactory behavior.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A computer-implemented method of deducing undefined service level objectives, said method comprising:

receiving user generated complaints regarding behavior of a system, where said complaints each comprise a severity parameter value, an entity parameter value, a nature-of- complaint parameter value, a timestamp parameter value, and a distillery cluster ID parameter value;

recording, by a computing device, system details representing a current state of said system corresponding to said timestamp parameter value that registers each of said complaints;

automatically analyzing, by said computing device, a history of said system details to extract common value bounds for one or more measurable parameters by weighing each of said system details with said severity parameter value, said entity parameter value, said nature- of-complaint parameter value, said distillery cluster ID parameter value, and a history of said complaints;

producing, by said computing device, a historical compilation of said system details based on said automatically analyzing;

identifying, by said computing device, at least one set of values in said historical compilation of said system details based on correlating complaint items of said historical compilation of said system details with patterns of information of said common value bounds of said historical compilation of said system details; and automatically deducing, by said computing device, service level objectives for said system based on said at least one set of values identified in said historical compilation of said system details;

where said entity parameter value comprises one of a job/stream value, a processing element value and a retention class value, where said nature-of-complaint parameter value comprises a behavior attribute of said system, and where said distillery cluster ID parameter value comprises retention class information and single storage location information.

2. The method according to claim 1, wherein said deducing comprises removing system details from said historical compilation of said system details.

3. The method according to claim 2, wherein said removing of said system details is triggered by a change in at least one of a workload access, a cumulative load on a physical component, a component response-time and throughput for a load characteristic, dependencies, and a workflow.

4. A computer-implemented method of deducing undefined service level objectives, said method comprising:

receiving user generated complaints regarding behavior of a system, where said complaints each comprise a severity parameter value, an entity parameter value, a nature-of- complaint parameter value, a timestamp parameter value, and a distillery cluster ID parameter value;

recording, by a computing device, system details representing a current state of said system corresponding to said timestamp parameter value that registers each of said complaints;

automatically analyzing, by said computing device, a history of said system details to extract common value bounds for one or more measurable parameters by weighing each of said system details with said severity parameter value, said entity parameter value, said nature- of-complaint parameter value, said distillery cluster ID parameter value, and a history of said complaints;

producing, by said computing device, a historical compilation of said system details based on said automatically analyzing;

automatically identifying, by said computing device, at least one set of values in said historical compilation of said system details; and automatically deducing, by said computing device, service level objectives for said system based on said at least one set of values identified in said historical compilation of said system details;

where said entity parameter value comprises one of a job/stream value, a processing element value and a retention class value, where said nature-of-complaint parameter value comprises a behavior attribute of said system, and where said distillery cluster ID parameter value comprises retention class information and single storage location information.

5. The method according to claim 4, wherein said deducing comprises removing system details from said historical compilation of said system details.

6. The method according to claim 5, wherein said removing of said system details is triggered by a change in at least one of a workload access, a cumulative load on a physical component, a component response-time and throughput for a load characteristic, dependencies, and a workflow.

7. The method according to claim 4, wherein said identifying of said at least one set of values comprises determining whether at least one of said values comprises a random abnormality compared to a mean of said values.

8. A computer-implemented method of deducing undefined service level objectives, said method comprising:

receiving user generated complaints regarding behavior of a system, where said complaints each comprise a severity parameter value, an entity parameter value, a nature-of- complaint parameter value, a timestamp parameter value, and a distillery cluster ID parameter value;

recording, by a computing device, system details representing a current state of said system corresponding said timestamp parameter value that registers to each of said complaints;

automatically analyzing, by said computing device, a history of said system details to extract common value bounds for one or more measurable parameters by weighing each of said system details with said severity parameter value, said entity parameter value, said nature- of-complaint parameter value, said distillery cluster ID parameter value, and a history of said complaints;

producing, by said computing device, a historical compilation of said system details based on said automatically analyzing;

automatically identifying, by said computing device, at least one set of values in said historical compilation of said system details based on correlating complaint items of said historical compilation of said system details with patterns of information of said common value bounds of said historical compilation of said system details; and automatically deducing, by said computing device, service level objectives for said system based on said at least one set of values identified in said historical compilation of said system details, said deducing comprising removing system details from said historical compilation of said system details, wherein said removing of said system details is triggered by a change in at least one of a workload access, a cumulative load on a physical component, a component response-time and throughput for a load characteristic, dependencies, and a workflow where said entity parameter value comprises one of a job/stream value, a processing element value and a retention class value, where said nature-of-complaint parameter value comprises a behavior attribute of said system, and where said distillery cluster ID parameter value comprises retention class information and single storage location information.

9. The method according to claim 8, wherein said identifying of said at least one set of values comprises determining whether at least one of said values comprises a random abnormality compared to a mean of said values.

10. A non-transitory program medium readable by a computer tangibly embodying a readable program of instructions when executed by said computer performs a method of deducing undefined service level objectives, said method comprising:

receiving user generated complaints regarding behavior of a system, where said complaints each comprise a severity parameter value, an entity parameter value, a nature-of- complaint parameter value, a timestamp parameter value, and a distillery cluster ID parameter value;

recording system details representing a current state of said system corresponding said timestamp parameter value that registers to each of said complaints;

automatically analyzing, by said computing device, a history of said system details to extract common value bounds for one or more measurable parameters by weighing each of said system details with said severity parameter value, said entity parameter value, said nature- of-complaint parameter value, said distillery cluster ID parameter value, and a history of said complaints;

producing, by said computing device, a historical compilation of said system details based on said automatically analyzing automatically identifying at least one set of values in said historical compilation of said system details based on correlating complaint items of said historical compilation of said system details with patterns of information of said common value bounds of said historical compilation of said system details; and automatically deducing service level objectives for said system based on said at least one set of values identified in said historical compilation of said system details;

where said entity parameter value comprises one of a job/stream value, a processing element value and a retention class value, where said nature-of-complaint parameter value comprises a behavior attribute of said system, and where said distillery cluster ID parameter value comprises retention class information and single storage location information.

11. The computer program product according to claim 10, wherein said deducing comprises removing system details from said historical compilation of said system details.

12. The computer program product according to claim 11, wherein said removing of said system details is triggered by a change in at least one of a workload access, a cumulative load on a physical component, a component response-time and throughput for a load characteristic, dependencies, and a workflow.

13. The computer program product according to claim 10, wherein said identifying of said at least one set of values comprises determining whether at least one of said values comprises a random abnormality compared to a mean of said values.

* * * * *